United States Patent [19]
Tsuta et al.

[11] Patent Number: 4,796,798
[45] Date of Patent: Jan. 10, 1989

[54] METHOD OF AND APPARATUS FOR CONTINUOUS PRODUCTION OF SEAM-WELDED METAL TUBING

[75] Inventors: Toshio Tsuta, Hyogo; Koji Kadota, Kobe; Shigetomo Matsui, Osaka; Hiroyuki Matsumura, Kobe; Hisao Hasegawa, Kobe; Hiromichi Nakamura, Kobe; Tetsuro Noma, Kobe; Hisahiko Miyazaki, Osaka; Munekatsu Furugen, Nishinomiya, all of Japan

[73] Assignees: Kawasaki Jukogyo Kabushiki Kaisha, Hyogo; Sumitomo Metal Industries Ltd., Osaka, both of Japan

[21] Appl. No.: 60,084

[22] Filed: Jun. 9, 1987

[30] Foreign Application Priority Data

Jun. 11, 1986 [JP] Japan .................................. 61-137087

[51] Int. Cl.⁴ ............................................... B23K 31/06
[52] U.S. Cl. ..................................... 228/146; 228/147; 228/222; 228/232; 228/17; 228/17.5; 228/46; 219/61.7
[58] Field of Search ................................ 228/144–147, 228/150, 222, 230, 232, 15.1, 17.5, 17.7, 46, 17; 219/61.7

[56] References Cited

U.S. PATENT DOCUMENTS

| | | | |
|---|---|---|---|
| 1,775,532 | 9/1930 | Boeuf | 228/222 |
| 1,960,523 | 5/1934 | Anderson | 228/147 |
| 1,998,139 | 4/1935 | Kurtze | 219/61.7 |
| 2,029,044 | 1/1936 | Westlinning | 219/61.7 |
| 2,666,831 | 1/1954 | Seulen et al. | |
| 2,673,274 | 3/1954 | Vaughan et al. | |
| 2,977,914 | 4/1961 | Gray et al. | 228/147 |
| 3,127,674 | 4/1964 | Kohler | 228/147 |
| 4,460,118 | 7/1984 | Ataka et al. | 228/146 |

FOREIGN PATENT DOCUMENTS

| | | | |
|---|---|---|---|
| 1292471 | 4/1969 | Fed. Rep. of Germany | 228/147 |
| 43-14092 | 2/1968 | Japan | 228/147 |
| 141393 | 11/1980 | Japan | 228/222 |
| 0050715 | 5/1981 | Japan | 228/147 |
| 0102313 | 8/1981 | Japan | 228/147 |
| 181792 | 11/1982 | Japan | 228/222 |
| 58-184073 | 10/1983 | Japan | 228/147 |
| 18292 | 1/1985 | Japan | 228/222 |
| 1050689 | 12/1966 | United Kingdom | |

*Primary Examiner*—M. Jordan
*Assistant Examiner*—Samuel M. Heinrich
*Attorney, Agent, or Firm*—Wenderoth, Lind & Ponack

[57] ABSTRACT

An apparatus for continuous production of seam-welded steel tubing is proposed. The apparatus includes a series of shaping rolls for shaping a strip taken out from a strip coil into a tubular intermediate product, the roll series including a finpass roll group. The tubular product is subjected to seam welding under the action of a seam welder. Before arrival at the welder, a substantial main part of the preformed tubing with exception of opposing edge zones thereof is subjected to heating by a heater compensate for excess compressive stresses induced in the edge zones, while these zones are subjected to cooling by a cooler for avoiding otherwise formation of disadvantageous edge wavings which would otherwise occur.

19 Claims, 3 Drawing Sheets

METHOD OF AND APPARATUS FOR CONTINUOUS PRODUCTION OF SEAM-WELDED METAL TUBING

BACKGROUND OF THE INVENTION

This invention relates to a method of and an apparatus for continuous production of seam-welded metal, preferably steel, tubings.

In the art of continuous manufacture of seam-welded steel pipes, a steel strip stock is taken out from a strip coil and subjected to a tube-shaping step and then finally to a seam-welding step. Before seam-welding, and thus during the tube-shaping step, preliminary heating of substantial part of the tubular intermediate product with exception of marginal zones along the opposing longitudinal edges is carried out for releasing residual compressive stresses due to plastic strain induced within said marginal zones in the tube-shaping step, said stresses resulting in disadvantageous formation of what is known as edge wavings or buckling among those skilled in the art, as will be described more fully hereinafter.

SUMMARY OF THE INVENTION

It is, therefore, an object of the present invention to provide a method of and an apparatus for continuous production of seam-welded metal tubing, capable of suppressing the formation of edge-wavings to a possible minimum.

For fulfillment of the above and further objects of the invention, it is proposed according to the invention to provide a method of continuous production of a seam-welded metal tubing, comprising the steps of: feeding a metal strip unwound from a strip coil; shaping the metal strip being fed into a preformed tubing having its longitudinal edges arranged in an opposing and abutting relationship, by means of a series of roll groups arranged substantially in line; welding the opposing longitudinal edges while the preformed tubing is being fed forward; heating, before the welding is carried out, a substantial part of the preformed tubing being fed with exception of edge zones including the longitudinal edges, to a temperature approximately 50° to 200° C. higher than room temperature; and cooling concurrently with the heating the edge zones of the preformed tubing being fed to keep the edge zones at a temperature of from room temperature to a temperature lower than the room temperature by approximately 50° C.

Further, according to the invention, there is provided an apparatus for continuous production of a seam-welded metal tubing, said apparatus comprising; a series of roll groups arranged substantially in line for shaping a metal strip unwound from a strip coil into a preformed tubing having its longitudinal edges arranged in an opposing and abutting relationship; means for welding said opposing longitudinal edges while the preformed tubing is being carried forward; means arranged in an upstream position from said welding means for heating a substantial part of the preformed tubing with exception of edge zones including said longitudinal edges of the tubing; and means arranged along the path of said longitudinal edges and substantially in parallel to said heating means for cooling said edge zones.

These and further objects, features and merits of the invention will become more apparent as the description proceeds with reference to the accompanying drawings.

DETAILED DESCRIPTION OF THE INVENTION

Figure 2:
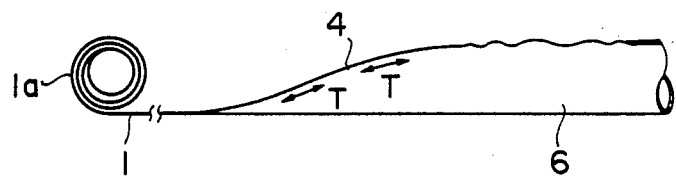
FIG. 2 is a schematic elevation view of a strip coil and a strip unwound therefrom and being shaped into a preformed tubing.
Figure 3:
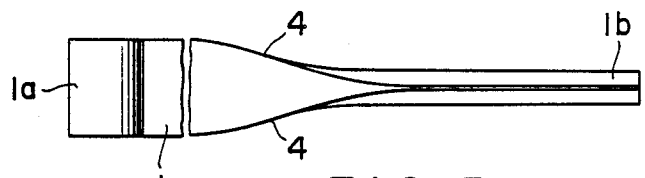
FIG. 3 is a plan view thereof.

Before entering into a detailed description of preferred embodiments of the present invention, a related prior art apparatus as is disclosed in Japanese Laid-Open Patent Publication, unexamined, No. Sho-58-184073, published Oct. 27, 1983 will be set forth with reference to FIGS. 1 through 3.

Figure 1:
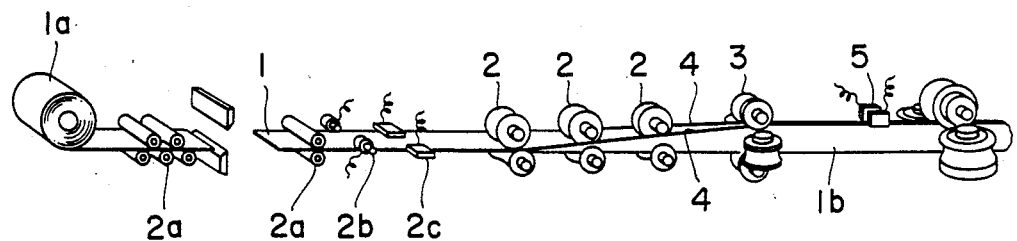
FIG. 1 is a schematic perspective view of a conventional seam-welded metal tubing manufacturing plant which constitutes the technical starting point of the present invention.

As is shown in FIG. 1, a steel strip 1 is previously wound in the form of a coil 1a.

The strip 1 is unwound from the coil 1a through a plurality of guide rollers 2a; edge guides 2b, 2c; and further through shaping roller pairs 2 and a finpass roller group 3 for performing a strip-rounding up and strip edge butt-joining work in succession, so as to provide a continuous rough tubing stock 1b. The longitudinal edges of the strip 1 are shown at 4, 4 positioned close together upstream of the finpass roller group 3. At a certain distance from the latter, there is provided a conventional heating means 5 for welding together the opposing longitudinal edges 4, 4 to provide a continuous seam-welded tubing.

As is commonly known, the material of the stock is subjected to higher, plastic tensile stresses T in proximity of the longitudinal edges 4, 4 than those at the other remaining portions 6 during the tube-shaping step, and, therefore, at the finpass zone, residual compressive stresses will be generated in the proximity of the edges 4, 4, while residual tensile stresses will appear in the remaining part 6 of the tubular stock, thus giving rise to formation of what is known as edge wavings or buckling among those skilled in the art in the proximity of these edges due to resulting buckling loads. It has been experienced that the seam-welding operation is considerably disturbed by the very presence of such edge wavings, if any.

In the conventional technique, the stock material at said other remaining areas 6 is subjected to a heat treatment so as to introduce a corresponding thermal expansion thereinto during the processing steps including the tube-shaping and seam-welding for the purpose of releasing the excessive residual compressive stresses otherwise appearing in the edge regions and to suppress the delicate and troublesome formation of edge wavings, as disclosed in U.S. patent application Ser. No. 754,202.

Figure 4:
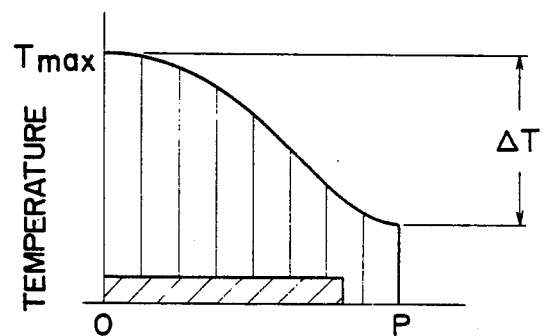
FIG. 4 is a diagram showing temperature distribution in the case of a conventional apparatus.

It should be noted that when the generation of the aforementioned kind of edge wavings is to be suppressed under utilization of specifically induced thermal stresses in the above-mentioned manner, the following problems have been encountered. More specifically, it has been observed that the thermal stresses intentionally induced for release of the compressive stresses originally appearing in the proximity of the strip edges depend upon the temperature difference $\Delta T$ (FIG. 4) as measured between the highest temperature at the heated area of the tubing stock and the temperature at the marginal areas including the longitudinal edges 4, 4, and that upon heating of only the substantial part of the stock with the exception of the marginal areas including the longitudinal edges, these areas are subjected to a considerable temperature increase as shown in FIG. 4 by virtue of the presence of heat conduction, resulting in an insufficient temperature difference $\Delta T$. In FIG. 4, "O" represents the lower central position of the tubing stock, while "P" represents the extreme end of the edge zone in a cross section of the stock.

As a countermeasure, it would be conceivable to elevate the maximum heating temperature Tmax. However, if this maximum heating temperature Tmax is raised too much, a considerably appreciable reduction of the quantity of liquid used for cooling and lubricating of the tubular stock surface would necessarily be invited due to excessive evaporation of the liquid, which gives rise in turn to an increase in the shaping torque and hence to difficulty in shaping. Therefore, there is a substantial limitation in this countermeasure.

Figure 5:
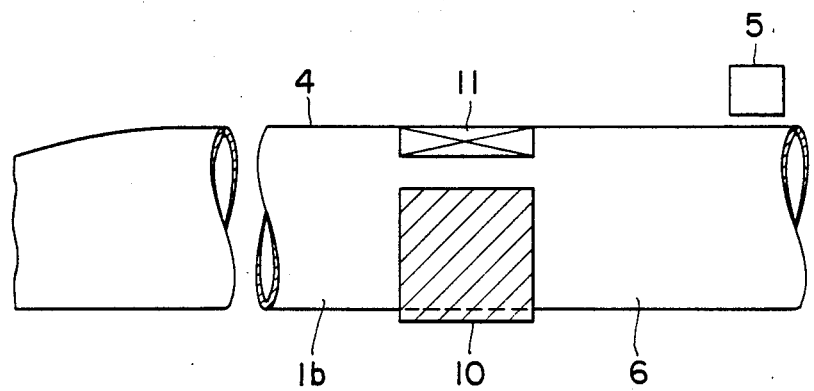
FIG. 5 is an enlarged elevation of an essential part of the apparatus in accordance with the invention.
Figure 6:
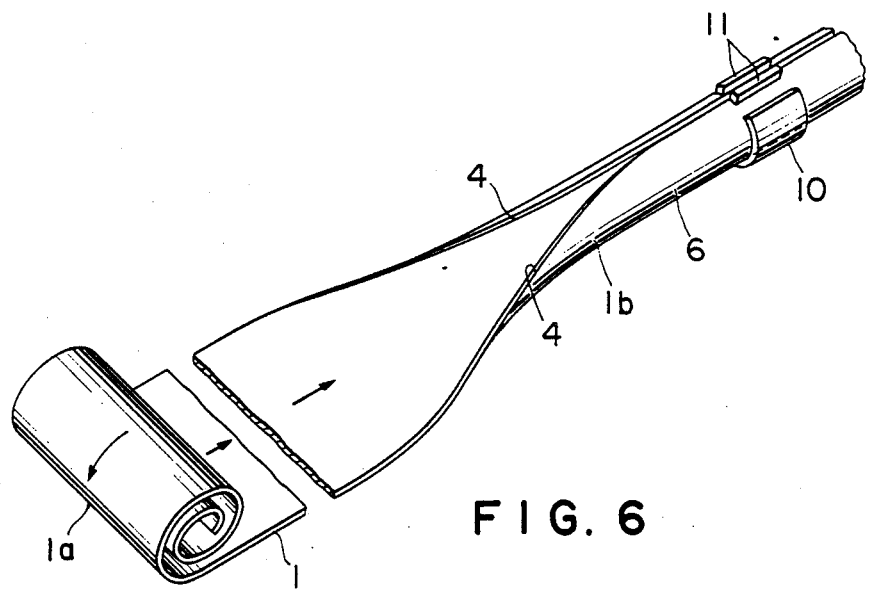
FIG. 6 is a perspective view showing the essential part of the apparatus of FIG. 5.

A preferred embodiment of the invention will now be described with reference to FIGS. 5 and 6, and in combination with FIG. 1.

Numeral 1b represents a tubular intermediate product or preformed tubing, as was referred to hereinbefore, which has been shaped from a metal strip 1 by passage through a series of shaping roller pairs 2 and is now kept in the finpass zone, when seen at a certain instantaneous moment, although, in practice, the strip or web 1 and the tubing 1b are continuously fed forward. Welding means 5 is provided as in the prior art.

Numeral 10 represents an arcuate heating means disposed circumferentially around the tubing 1b and adapted for heating a substantial part of the tubing 1b with the exception of the edge zones including the opposing edges 4, 4. As the heating means 10, any suitable conventional heater, such as a high frequency induction heater, gas burner(s) or infrared radiation heater, may be adopted. The heating means 10 is disposed over the lowest part of the tubing 1b and substantial areas of the lateral parts thereof as shown. The temperature of heating by the heating means 10 is such as to heat the substantial part of the preformed tubing to a temperature which is higher than room temperature by approximately 50° to 200° C. The substantial part to be heated is, for example, approximately 75% of the circumferential dimension of the tubing 1b and the temperature of heating is, for example, approximately 100° C. in the case where the thickness of the strip is between 0.75% and 1% of the diameter of the tubing and the forming apparatus is of standard type.

Numeral 11 represents cooling means disposed along, and adapted for cooling the edge zones of the tubular stock 1b. As the cooling means 11, any suitable conventional cooler, such as an air jet cooler; water jet cooler or liquefied nitrogen gas cooler may be adopted. A pair of cooling means 11 are provided along the respective paths of the edge zones to prevent temperature rise of the latter in the embodiment shown, but a single cooling means may be provided for cooling both the opposite edge zones instead of a pair of heating means. The cooling means 11 is such as to keep the edge zones at a temperature of from room temperature to a temperature lower than the room temperature by approximately 50° C.

The maximum heating temperature Tmax provided by the heating means 10 must be selected so as to avoid substantial reduction, due to evaporation, in the quantity of lubricating and cooling liquid medium applied to the surface of the tubular stock 1b in consideration of otherwise possible invitation of increase in the shaping torque an in difficulty in the shaping. On the other hand, selection of the cooling temperature Tc at the cooling means 11 must be higher than that at which the detrimental formation of frost at the stock edges 4, 4 is liable to occur, in the case where the longitudinal edges of the tubing stock 1b are welded by TIG welding.

Figure 7:
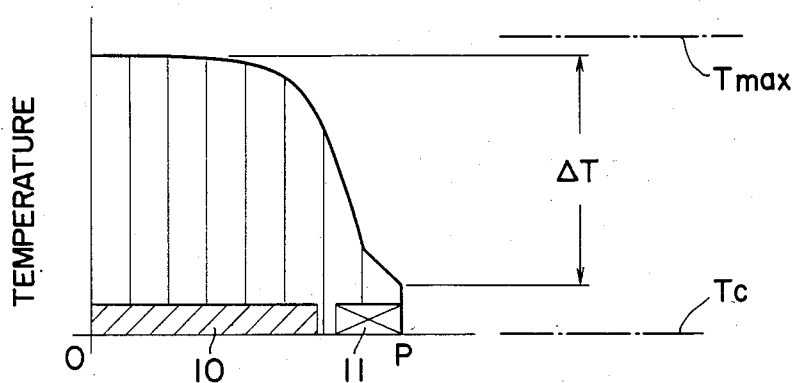
FIG. 7 is a diagram similar to FIG. 4, however, in the case of the present invention.

With such positive cooling of the edge zones including the edges 4, 4 in the aforementioned manner, the resulting temperature distribution is such as indicated in FIG. 7, showing a nearly rectangular profile without a temperature rise and with a larger temperature difference $\Delta T$ for inducing thermal stresses than those in conventional comparative cases. Again, symbol "O" represents the lower central position of the tubing stock, while symbol "P" represents the extreme end of the edge zone in a cross-section of the tubular stock 1b.

As was referred to above, the temperature difference $\Delta T$ can be substantially increased according to the present invention, resulting in a considerable further reduction in the residual compressive stresses in the edge zones including edges 4, 4 in comparison with those appearing in conventional cases. Therefore, in the case of the inventive method and apparatus, even if the metal strip stock should have a rather thin wall thickness, seam-welded metal tubing can be manufactured continuously without conventional problems caused by edge wavings or buckling in an optional manner.

Figure 8:
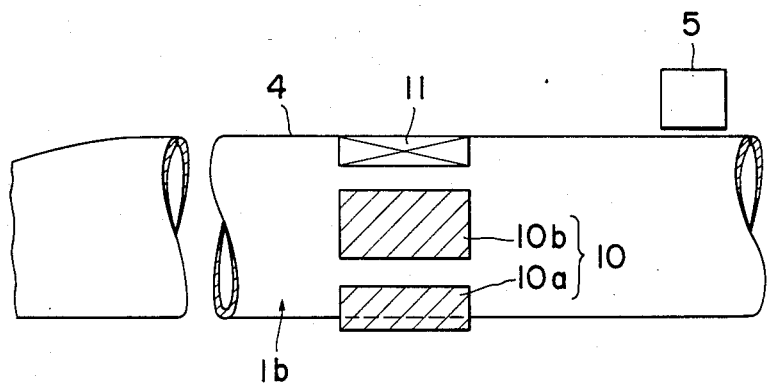
FIG. 8 is a view similar to FIG. 5 showing, however, in the case of a first modification of the main and standard embodiment shown in FIGS. 5 and 6.

In FIG. 8, a first modification of the foregoing embodiment is shown. In this case, the heating means 10 is separated into several heating units 10a, 10b . . . , which are arranged in parallel and circumferentially around the tubing stock 1b. These units 10a, 10b . . . are designed and arranged to be separately controllable, although not illustrated.

Figure 9:
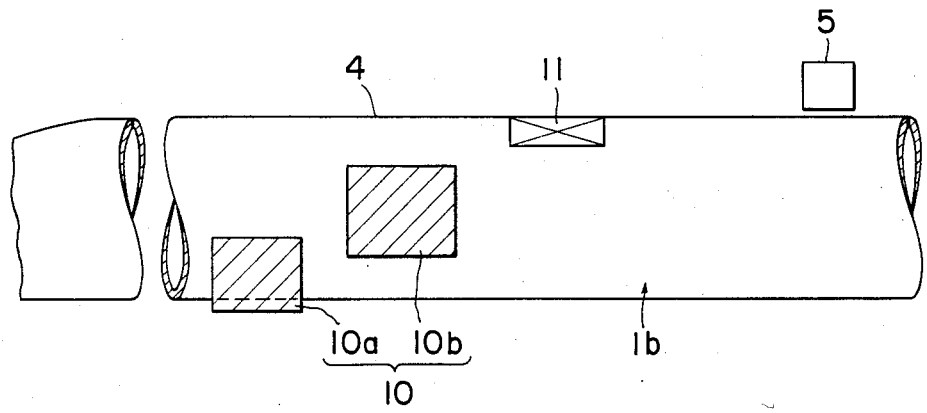
FIG. 9 is a view similar to FIG. 8, illustrating, however, a second modification of the present invention.

In the case of a second modification shown in FIG. 9, the cooling means 11, and a plurality of divided and separated heating units 10a, 10b . . . are staggered one after another in the longitudinal direction of the tubing stock 1b.

With use of these modified arrangements, substantially similar effects can be obtained with the case of the foregoing main embodiment.

Especially, with use of the second modification shown in FIG. 9, wherein the cooling means 11 is arranged in the so-called finpass zone, the necessary temperature difference $\Delta T$ can be realized in a more positive manner.

It will be thus clearly understood that with use of the inventive method and apparatus wherein a substantial body portion of the tubular strip stock with exception of marginal edge zones thereof including the side edges is subjected to heating, while these zones are forcibly cooled, the effective temperature difference for generation of necessary thermal stresses to release otherwise appearing excessive compression stresses in the marginal edge zones of the stock, giving rise to the so-called edge wavings or buckling which are rather more remarkable with a decrease of the thickness of the material strip, can be made greater than in the conventional cases, thereby assuring positively high quality metal tubings in a reliable manner.

While the invention has been described with reference to the foregoing embodiments, it will be understood by those skilled in the art that various changes and modifications may be made thereto which fall within the scope of the appended claims.

What is claimed is:

1. A method of continuous production of a seam-welded metal tubing, comprising the steps of:
    feeding a metal strip unwound from a strip coil;
    shaping the metal strip being fed into a preformed tubing having its longitudinal edges arranged in an opposing and abutting relationship, by means of a series of roll groups arranged substantially in line, said roll groups including a finpass roll group for shaping the strip preparatory to bringing said longitudinal edges into said opposing and abutting relationship;
    welding the opposing and abutting longitudinal edges at a position downstream of said finpass roll group while the preformed tubing is being fed forward;
    heating in the zone of the finpass roll group, before the welding is carried out, a substantial part of said preformed tubing being fed through the zone of said finpass roll group with exception of edge zones including said longitudinal edges, to a temperature approximately 50° to 200° C. higher than room temperature; and
    cooling in the zone of the finpass roll group concurrently with the heating said edge zones of the preformed tubing being fed through said zone of the finpass roll group to keep the edge zones at a temperature of from room temperature to a temperature lower than the room temperature by approximately 50° C.

2. The method of claim 1, wherein the heating is carried out at positions spaced apart circumferentially of the tubing.

3. The method of claim 1, wherein the heating is carried out at positions displaced both circumferentially and longitudinally of the tubing.

4. An apparatus for continuous production of a seam-welded metal tubing, comprising:
    a series of roll groups arranged substantially in line for shaping a metal strip unwound from a strip coil into a preformed tubing having its longitudinal edges arranged in an opposing and abutting relationship, said roll groups including a finpass roll group for shaping the strip preparatory to bringing said longitudinal edges into said opposing and abutting relationship;
    means for welding the opposing and abutting longitudinal edges of the strip at a position downstream of said finpass roll group while said preformed tubing is being carried forward;
    heating means arranged in the zone of said finpass roll group for heating a substantial part of said preformed tubing with exception of edge zones including said longitudinal edges of said tubing; and
    cooling means arranged along said longitudinal edges of the strip which are passing through the zone of the finpass roll group, said cooling means being disposed substantially in parallel to said heating means for cooling said edge zones, when seen transversely to said tubing.

5. The apparatus of claim 4, wherein said cooling means and said heating means are arranged substantially in a common circumferential plane of the preformed tubing.

6. The apparatus of claim 4, wherein said heating means and said cooling means are arranged in staggered positions when seen transversely to said preformed tubing.

7. The apparatus of claim 6, wherein said heating means is divided into a plurality of heating units and arranged circumferentially around the preformed tubing.

8. The apparatus of claim 7, wherein said divided heating units are arranged in a staggered manner when seen transversely to the preformed tubing.

9. The apparatus of claim 4, wherein said cooling means is an air jet cooler.

10. The apparatus of claim 4, wherein said cooling means is a water jet cooler.

11. The apparatus of claim 4, wherein said cooling means is a liquefied nitrogen cooler.

12. An apparatus for continuous production of a seam-welded metal tubing, comprising:
    a series of roll groups arranged substantially in line for shaping a metal strip unwound from a strip coil into a preformed tubing having its longitudinal edges arranged in an opposing and abutting relationship, said roll groups including a finpass roll group for shaping the strip preparatory to bringing said longitudinal edges into said opposing and abutting relationship;
    means for welding the opposing and abutting longitudinal edges of the strip at a position downstream of said finpass roll group while said preformed tubing is being carried forward;
    means comprising heating means and cooling means for increasing a temperature difference between a central zone located in the longitudinal center of the strip and edge zones located along the longitudinal edges of the strip so that the central zone is at a higher temperature than the edge zones to reduce residual compressive stresses in the edge zones and thus reduce buckling in the edge zones;
    said heating means arranged in the zone of said finpass roll group for heating a substantial part of said preformed tubing with exception of edge zones including said longitudinal edges of said tubing; and
    said cooling means arranged along said longitudinal edges of the strip which are passing through the zone of the finpass roll group, said cooling means being disposed substantially in parallel to said heating means for cooling said edge zones, when seen transversely to said tubing.

13. The apparatus of claim 12, wherein said cooling means and said heating means are arranged substantially in a common circumferential plane of the preformed tubing.

14. The apparatus of claim 12, wherein said heating means and said cooling means are arranged in staggered positions when seen transversely to said preformed tubing.

15. The apparatus of claim 14, wherein said heating means is divided into a plurality of heating units and arranged circumferentially around the preformed tubing.

16. The apparatus of claim 15, wherein said divided heating units are arranged in a staggered manner when seen transversely to the preformed tubing.

17. The apparatus of claim 12, wherein said cooling means is an air jet cooler.

18. The apparatus of claim 12, wherein said cooling means is a water jet cooler.

19. The apparatus of claim 12, wherein said cooling means is a liquefied nitrogen cooler.

* * * * *